T. B. WESTON.
Box-Scrapers.

No. 150,117.

Patented April 21, 1874.

WITNESSES

INVENTOR
T. B. Weston
his Attorneys.

UNITED STATES PATENT OFFICE.

THOMAS B. WESTON, OF BALTIMORE, MARYLAND.

IMPROVEMENT IN BOX-SCRAPERS.

Specification forming part of Letters Patent No. 150,117, dated April 21, 1874; application filed September 17, 1873.

*To all whom it may concern:*

Be it known that I, THOMAS B. WESTON, of the city and county of Baltimore and State of Maryland, have invented a new and useful Improved Box-Scraper; and I do hereby declare the following to be a full, clear, and exact description of the same, reference being had to the accompanying drawings, forming part of this specification, in which—

Figure 1:
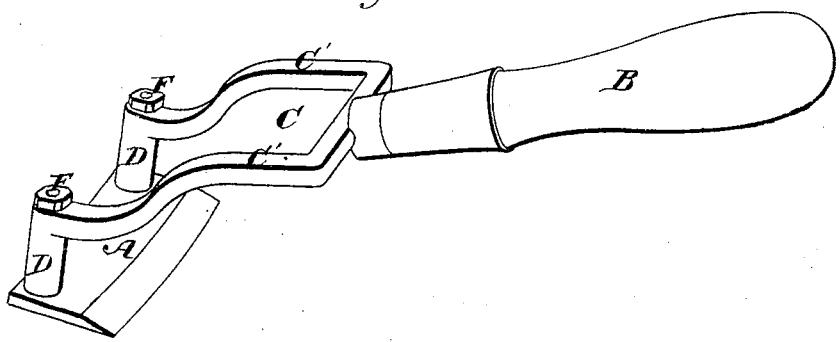
Figure 2:
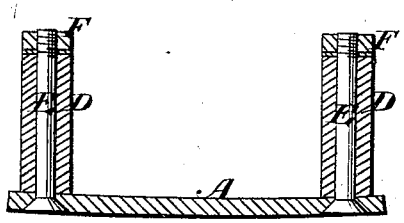
Figure 3:
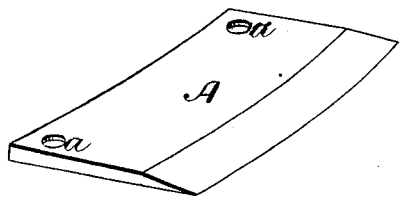

Figure 1 is a perspective view of my invention; Fig. 2, a sectional view, showing the attachment of the blade to the bifurcated handle; and Fig. 3, a perspective view of the blade detached.

Similar letters of reference in the accompanying drawings denote the same parts.

This invention has for its object to provide an improved tool for scraping or shaving the surfaces of merchandise-boxes, &c., in removing old marks; and to this end it consists in the peculiar construction which I will now proceed to describe.

In the drawings, A represents the scraper or blade, composed of a single rectangular piece, suitably sharpened at its cutting-edge, and provided with an orifice, $a$, at each end. B represents the handle, into which is inserted the bifurcated metallic portion C, as shown in Fig. 1. The arms or bifurcations C' C' of the latter are curved downward, and provided at their outer ends with downwardly-projecting hollow stems D D, which are located at the same distance apart as the orifices $a$ of the scraper A. The orifices $a$ are suitably reamed to receive the beveled heads of bolts E E, which pass through said orifices and the hollow stems D, and are secured at the upper ends of the latter by nuts F F. The scraper is thus securely attached to the arms C', and can be easily removed to be sharpened or replaced when worn out.

The lower side of the scraper presents a plane surface, with no projections to come in contact with the box or other article being scraped, while the downward curve of the arms C' and projection of the stems D enable the operator to hold the instrument, and vary the inclination of the scraper without danger of injuring his fingers on the surface of the box.

Having thus described my invention, what I claim is—

The curved arms C, provided with the hollow stems D, in combination with the scraper A and bolts E, all constructed and arranged substantially as shown and described.

THOMAS B. WESTON.

Witnesses:
NATHAN K. ELLSWORTH,
T. K. CHURCH.